United States Patent [19]
Akrep

[11] Patent Number: 6,105,914
[45] Date of Patent: Aug. 22, 2000

[54] DEVICE FOR SUSPENDING AND DIRECTIONALLY FOCUSING LOADS

[76] Inventor: Michael J. Akrep, P.O. Box 3, 217 Russell St., Hadley, Mass. 01035

[21] Appl. No.: 08/822,986

[22] Filed: Mar. 21, 1997

[51] Int. Cl.$^7$ .................................................. E04G 3/00
[52] U.S. Cl. ..................... 248/291.1; 248/317; D14/224
[58] Field of Search ............................ 248/291.1, 300, 248/317, 682, 684, 693; D8/349, 354; D14/224

[56] References Cited

U.S. PATENT DOCUMENTS

| | | | |
|---|---|---|---|
| D. 270,533 | 9/1983 | Piercy | D14/37 |
| D. 282,065 | 1/1986 | Piercy | D14/37 |
| D. 318,671 | 7/1991 | Naumann | D14/224 |
| 2,949,323 | 8/1960 | Moorhead | 287/54 |
| 4,037,416 | 7/1977 | Preus | 114/253 |
| 4,765,580 | 8/1988 | Wright | D14/224 |
| 5,343,920 | 9/1994 | Cady | 152/396 |
| 5,429,007 | 7/1995 | Khachaturian et al. | 73/862 |

*Primary Examiner*—Ramon O. Ramirez
*Assistant Examiner*—Kimberly Wood
*Attorney, Agent, or Firm*—Deborah A. Basile

[57] ABSTRACT

Disclosed is a device for suspending loads that also allows for adjustment and focusing of the load at desired elevation and azimuth angles. The device can be used interchangeably with loads of various geometric attributes because it is designed to operate based on a load's center of gravity. Furthermore, the device has linear control function to enable easy and precise focusing of the elevation of the load.

24 Claims, 3 Drawing Sheets

DEVICE FOR SUSPENDING AND DIRECTIONALLY FOCUSING LOADS

BACKGROUND

1. Field of the Invention

This invention relates to the suspension of loads and more particularly to a method and device for suspending loads based on the load's center of gravity. The device further provides for precise adjustment and focusing of the load at a desired elevation and azimuth. As used herein, the term elevation is defined relative to a horizontal plane and the term azimuth is defined relative to the centerline of the suspended load.

2. Information Disclosure Statement

It is often desirable to suspend instruments such as, but not limited to, loudspeakers, video projectors, and video monitors at elevated positions. For effective operation, it is beneficial to provide for easy adjustment and focusing of the instrument at a desired elevation and azimuth.

Traditional suspension devices have three common characteristics: (1) the devices are based on the geometric attributes of the load to be suspended, (2) the adjustment of a load's elevation operates on a nonlinear control function, and (3) adjustment of load's azimuth is not possible. Such characteristics present problems. A device that is designed for a particular load geometry causes problems of inconvenience and cost. Such a device cannot be used interchangeably among loads with differing geometries. A different device adapted for each particular load's geometry is required for each different load. Thus, one would need to have access to a vast inventory of different devices to accommodate a wide range of loads. Nonlinear control functions, on the other hand, present problems with the effective operation of the device. The use of a nonlinear control function makes adjustment extremely counter intuitive. Precise adjustment and focusing of the load at a desired elevation and azimuth is difficult and often not possible with such devices.

What is needed, and hence, what would contribute to the state of the art, is a single suspension device that can be used interchangeably on loads with various geometric attributes. Further, it would be desirable to make a device with a linear control function to provide easy and precise adjustment and focusing of the load at a desired elevation. Furthermore, it would be desirable to direct the load at a desired azimuth.

In the present state of the art, when one or more loads are hung in a vertical chain, the tensile forces are transferred through the body of the upper load requiring reinforcements within the upper load such as an internally constructed steel frame to keep the bottom load from tearing apart the upper load. The internal steel frame adds cost to manufacture the load and it adds unnecessary weight to the suspended load.

The present invention is designed and constructed such that when it is used to hang more than one load in a vertical chain, the tensile forces of any load or loads lower in the chain are transferred through the devices higher in the vertical chain.

The present invention allows for the suspension of a load or vertical chain of loads by two points only, instead of three or four points per load in the dominant prior art.

BRIEF SUMMARY OF THE INVENTION

Recognizing the problems with traditional suspension devices, we have embarked upon an altogether different approach. We have focused our attention on designing a device that is suitable for a wide range of loads. In so doing, we recognize that a truly superior suspension device is most preferably one which is designed to act upon an attribute that all loads have in common—the load's center of gravity. Our device can be used interchangeably with loads of various geometric attributes, while in the past a different device was required for each different load geometry and size. Furthermore, we have designed a device that has a linear control function so as to provide for easy and precise elevation adjustability.

BRIEF DESCRIPTION OF THE DRAWINGS

For a better understanding of the present invention, and to show how it may be carried into effect, reference will now be made, by way of example only, to the accompanying drawings in which.

DETAILED DESCRIPTION OF THE PREFERRED EMBODIMENT

Figure 1:
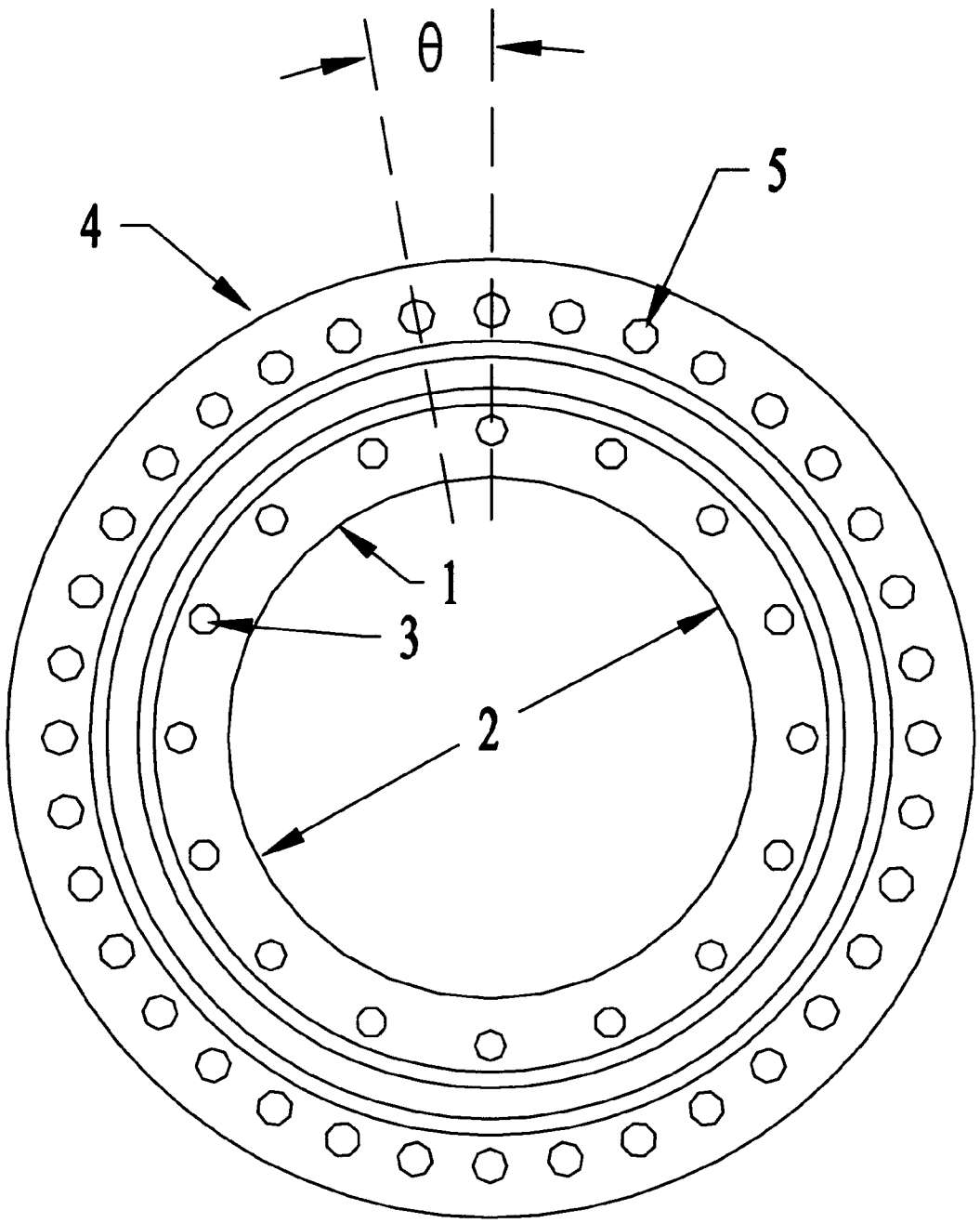
FIG. 1 is a top view of a suspension device in accordance with the invention.
Figure 2:
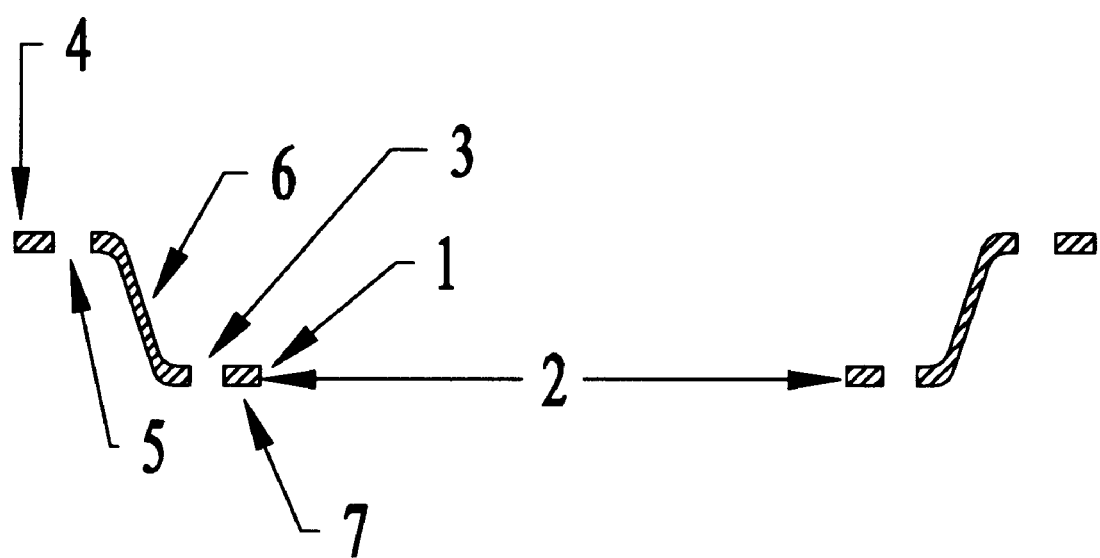
FIG. 2 is a cross sectional side view of the suspension device shown in FIG. 1.
Figure 3:
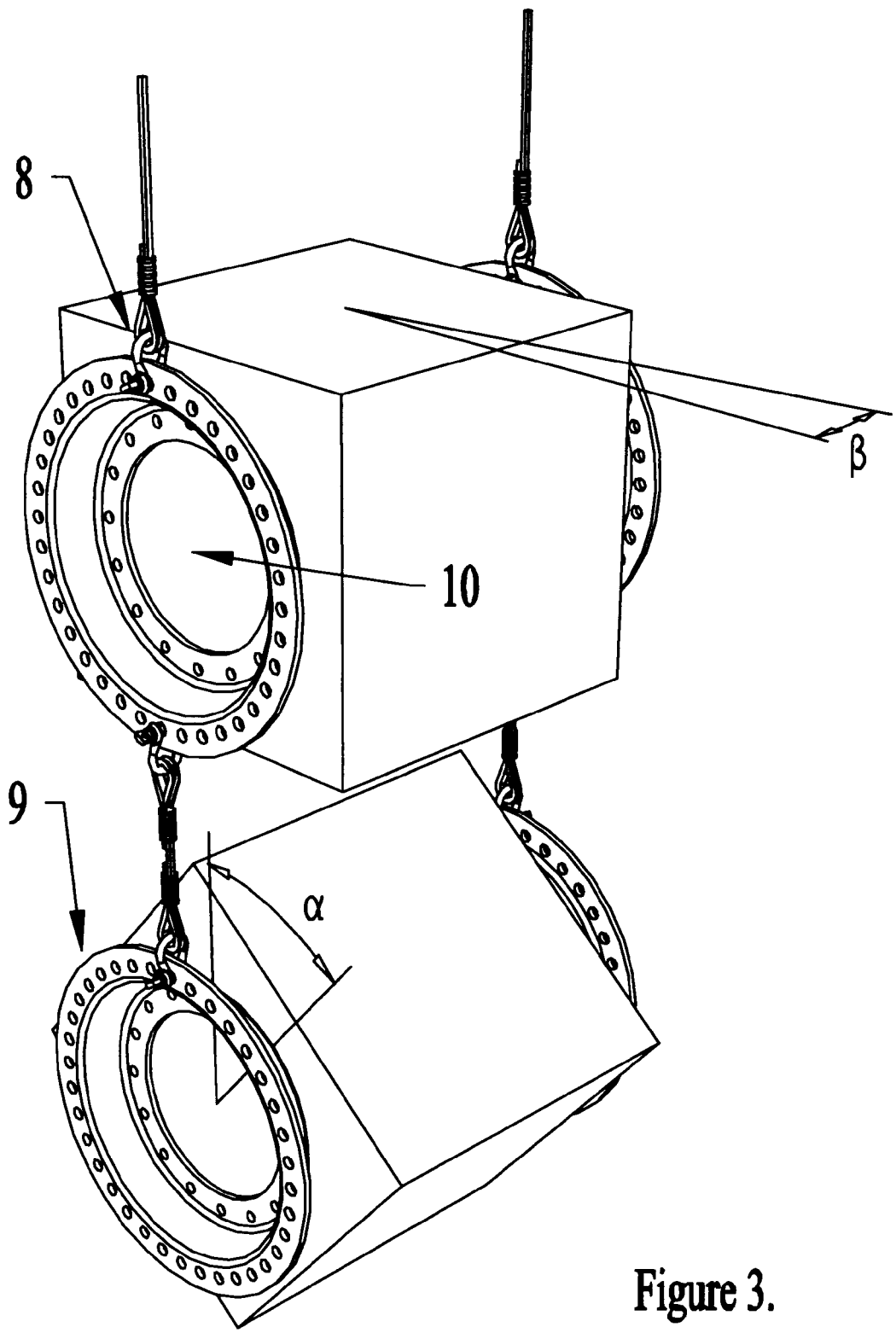
FIG. 3 is a perspective view of four suspension devices operating in accordance with the invention and holding two loads.

Referring now to FIGS. 1–3, a suspension device 9 in accordance with the invention includes a ring-shaped inner rim 1, a center hole 2 located at the center of the inner rim 1, mounting holes 3 distributed in a circular pattern within the inner rim 1, a ring-shaped outer rim 4, rigging fitting holes 5 distributed in a circular pattern within the outer rim 4, and a transition 6 connecting the inner rim 1 to the outer rim 4, The center hole, 2, and more specifically, the center point within the center hole 2, defines the central axis of the device.

As illustrated in FIG. 1, the suspension device 9 is disk shaped. The device is described in terms of a preferred embodiment having ring-shaped inner and outer rims, and an overall circular shape. Such shapes, however, are not limitations. For example, other shapes allowing the same result, such as the device with octagonal rims and octagonal overall shape, are also included. It may be made out of any suitable material including a structural metal or an engineered plastic. As illustrated in FIG. 2, the outer rim 4 is located above the inner rim 1. The inner rim 1 has an inner radius ($r_1$) and an outer radius ($r_2$) measured from the center point. The outer rim 4 has an inner radius ($r_3$) and an outer radius ($r_4$) measured from the center point. The outer rim 4 inner radius ($r_3$) is larger than the inner rim 1 outer radius ($r_2$). Such an arrangement creates a connection between the inner rim 1 and the outer rim 4 through a transition 6 that extends upwards from the inner rim 1 to the outer rim 4, to form an angle φ between the inner rim 1 and the transition 6. For added strength, the transition 6 is preferably a solid sheet of material as shown in FIG. 3. The shape and size of the transition 6 may be altered or adjusted in any way to meet the requirements of the manufacturing process. The inner rim 1 may have an inner radius ($r_1$) of approximately 3.85", or a diameter of approximately 7.70" and the outer rim 4 may have an outer radius ($r_4$) of approximately 7.00", or a diameter of approximately 14.00". About 2–16 mounting holes 3 are distributed in a circular pattern in the inner rim 1. Preferably, 8 mounting holes 3 are evenly spaced in a circular pattern in the inner rim 1, and preferably the mounting holes 3 are all spaced at the same radius from the center point, as shown in FIGS. 1 and 3. About 2–72 rigging fitting holes 5 are distributed in a circular pattern in the outer rim 4. In one embodiment, 36 rigging fitting holes 5 are evenly spaced in a circular pattern in the outer rim 4. In this embodiment, the rigging fitting holes 5 are at equal radii from the center point and are spaced evenly from each other. With such an arrangement, an angle φ is formed between any two adjacent rigging fitting holes 5. This angle φ is in the range of approximately 10°–20°. Preferably, the angle φ is constant between each pair of adjacent rigging fitting holes. Preferably, the angle φ is about 10°. If an individual wished to suspend a load at a given angle, all he would do is choose a particular rigging fitting hole 5 from which to suspend the device 9. For example, FIG. 3 shows a series of two loads. In the top load, the suspension device 9 is suspended from the rigging fitting hole 5 that we will designate as the 0° hole. This is the 0° hole because it is the rigging fitting hole 5 from which the device 9 would be suspended to hold the load in an upright position. In the bottom load, the suspension device 9 is suspended from the rigging fitting hole 5 four holes to the left of the 0° hole. Between each pair of holes is the angle φ. Thus, the device is at an angle of 4φ downward. If φ is 10°, then, the device would be at an angle 40° downward. Rigging fitting holes 5 to the right of the 0° hole direct the load at an upward angle, while rigging fitting holes 5 to the left of the 0° hole direct the device downward. In addition, this arrangement of rigging fitting holes 5 allows a plurality of suspension devices 9 to be suspended in a chain such that the chosen suspension angle of a "top" suspension device 9 is not disturbed by subsequently suspending additional loads from that "top" suspension device 9. To accomplish this, a load is suspended from a "top" suspension device 9 from a rigging fitting hole 5 that is diametrically opposed to the rigging fitting hole 5 from which the "top" device is suspended. Diametrically opposed holes are those between which a line is drawn that passes through the center point of the suspension device 9. This type of an arrangement is shown in FIG. 3. Each mounting hole 3 has a diameter in the range of 0.1" to 1.0" and most preferably about 0.5". Each rigging fitting hole 5 has a cross-sectional area in the range of about 0.01 to 1 square inch.

The inner rim 1 has a top surface, a bottom surface, and a thickness ($t_1$) between the top and bottom surfaces. The outer rim 4 has a top surface, a bottom surface, and a thickness ($t_2$) between the top surface and the bottom surface. The transition 6, which is preferably solid, also has a thickness ($t_3$). The thickness of the overall suspension device 9 may be uniform throughout, such that ($t_1$) is equal to ($t_2$) and (t3). The overall suspension device 9 may also have a non-uniform thickness throughout. As illustrated in FIG. 3, two suspension devices 9 are mounted on each load. The suspension devices 9 have an ultimate strength to support loads over 7000 pounds. The two devices 9 are mounted symmetrically on the left and right sides of the load 10. The two devices 9 must be mounted such that the center axis of both devices 9 are coaxial and pass through the center of gravity of the load. Each device 9 is attached to the load 10 with a number of fasteners such as bolts that pass through the mounting holes 3. When the suspension device 9 is attached to a load, the mounting surface 7 is in contact with the load 10. The mounting surface is the inner rim 1 bottom surface, which is the surface farthest away from the outer rim 4. The load must be attached to the suspension device 9 such that the mounting surface is in intimate and secure contact with the load surface. This is accomplished by use of fasteners that apply a force parallel to the axis of the device. In other words, a force perpendicular to the load surface and perpendicular to the mounting surface. The suspension device 9 is suspended with a number of rigging fittings that pass through the rigging fitting holes 5. Preferably, one rigging fitting is used per suspension device 9. The suspension device 9 is typically suspended from an elevated surface, such as a ceiling or a beam in the ceiling. To accomplish this type of suspension, a rigging fitting must be used. Rigging fittings are fasteners that apply a force radial to the suspension device 9. A typical rigging fitting is a shackle, which can be made up of a ring-like portion and a cable or rope assembly. The ring-like portion passes through the rigging fitting hole 5. The cable or rope assembly then attaches the ring-like portion to the elevated surface. A force is applied through the cable or rope assembly in a direction radial to the suspension device 9. In addition, because the rigging fitting often includes such a ring-like portion that passes through the rigging fitting holes 5, the rigging fitting holes must not be planar with the mounting surface of the device. Such a planar arrangement would leave no room between the load and the suspension device through which the ring could pass. Thus, as set forth, a transition 6 at an angle φ to the inner rim 1 is required.

Directional focusing of the load 10 is achieved by selecting which rigging fitting holes 5 are used to suspend the load 10. An elevation angle α (alpha) is achieved by using matching rigging holes 5 on each load suspension device 9. The size of the elevation angle α (alpha) is controlled by the pair of matching rigging fitting holes 5 that is chosen. An azimuth angle β (Beta) is achieved by using unmatching rigging fitting holes 5 on each load suspension device 9. A larger angular difference θ (theta) between the unmatched pair of rigging fitting holes 5 yields a larger azimuth angle β (Beta).

While the foregoing has been described in considerable detail and in forms of preferred embodiments, these are not to be construed as limitations on the disclosure or claims to follow. Modifications and changes that are within the purview of those skilled in the art are intended to fall within the scope of the following claims.

What is claimed is:

1. A suspension device, steadily hanging a load while enabling said load to be adjusted and focused at a desired elevation by a linear control function and enabling said load to be adjusted and focused at a desired azimuth, comprising:

a ring-shaped inner rim;
     said inner rim having an inner radius ($r_1$), and an outer radius ($r_2$), said inner radius ($r_1$) and outer radius ($r_2$) extending from a center point in said device;
     said inner rim inner radius ($r_1$) defining a center hole in said device;
     said inner rim having a bottom surface, a top surface, and a thickness ($t_1$) between said bottom surface to said top surface;
     said bottom surface of said inner rim being a mounting surface said load;
   a plurality of mounting holes distributed in a circular pattern in said inner rim;
   a plurality of fasteners that pass through said mounting holes and attach said device to said load;
   a ring-shaped outer rim concentric with said inner rim;
     said outer rim having an inner radius ($r_3$), and an outer radius ($r_4$), said inner radius ($r_3$) and outer radius ($r_4$) extending from said center point in said device;
     said outer rim having a bottom surface, a top surface, and a thickness ($t_2$) between said bottom surface to said top surface;

a plurality of rigging fitting holes distributed in a circular pattern in said outer rim;

a plurality of rigging fittings that pass through said rigging fitting holes and suspend said device;

a transition that extends from and connects said inner rim to said outer rim;

said transition having a thickness ($t_3$); and said transition extending at an angle $\phi$ from said inner rim.

2. The device as claimed in claim 1 wherein each said mounting hole has a diameter in the range of about 0.1 to 1 inch.

3. The device as claimed in claim 2 wherein each said mounting hole has a diameter of about 0.5 inches.

4. The device as claimed in claim 1 wherein said mounting holes are evenly spaced in a circular pattern in said inner rim.

5. The device as claimed in claim 4 wherein there are about 2 to 16 said mounting holes.

6. The device as claimed in claim 1 wherein each said rigging fitting hole has a cross-sectional area in the range of about 0.01 to 1 square inch.

7. The device as claimed in claim 6 wherein each said rigging fitting hole has a cross-sectional area of about 0.15 square inch.

8. The device as claimed in claim 1 wherein said rigging fitting holes are evenly spaced in a circular pattern in said outer rim such that an angle $\theta$ from said center point is formed between any two adjacent rigging fitting holes.

9. The device as claimed in claim 8 wherein there are about 2 to 72 said rigging fitting holes.

10. The device as claimed in claim 1 wherein said thickness ($t_1$) is in the range of about 0.625 to 0.5 inch.

11. The device as claimed in claim 10 wherein said thickness ($t_1$) is about 0.25 inch.

12. The device as claimed in claim 1 wherein said thickness ($t_2$) is in the range of about 0.1 to 0.5 inch.

13. The device as claimed in claim 12 wherein said thickness ($t_2$) is about 0.25 inch.

14. The device as claimed in claim 1 wherein said inner rim outer radius ($r_2$) is less than said outer radius ($r_2$) rim inner radius ($r_3$).

15. The device as claimed in claim 1 wherein said rigging fittings are shackles.

16. The device as claimed in claim 1 wherein said device is fabricated of metal.

17. The device as claimed in claim 16 wherein said device is fabricated of steel.

18. The device as claimed in claim 1 wherein said device is fabricated of an engineered plastic.

19. The device as claimed in claim 1 wherein said transition is solid throughout.

20. The device as claimed in claim 1 wherein said inner rim thickness ($t_1$) is equal to said outer rim thickness ($t_2$) and is equal to said transition thickness ($t_3$).

21. The device as claimed in claim 5 wherein said mounting holes are all distributed at an equal radius from said center point.

22. The device as claimed in claim 9 wherein said rigging fitting holes are all distributed at an equal radius from said center point.

23. The device as claimed in claim 22 wherein said angle $\theta$ is between 10°–20°.

24. A suspension device, steadily hanging a load while enabling said load to be adjusted and focused at a desired elevation by a linear control function and enabling said load to be adjusted and focused at a desired azimuth, comprising:

a ring-shaped inner rim;

said inner rim having an inner radius ($r_1$), and an outer radius ($r_2$), said inner radius ($r_1$) and outer radius ($r_2$) extending from a center point in said device;

said inner rim inner radius ($r_1$) defining a center hole in said device;

said inner rim having a bottom surface, a top surface, and a thickness ($t_1$) between said bottom surface to said top surface;

said bottom surface of said inner rim being a mounting surface attached to said load;

a plurality of mounting holes distributed in a circular pattern in said outer rim;

a plurality of fasteners that pass through said mounting holes attaching said device to said load;

a ring-shaped outer rim concentric with said inner rim;

said outer rim having an inner radius ($r_3$), and an outer radius ($r_4$), said inner radius ($r_3$) and outer radius ($r_4$) extending from said center point in said device;

said outer rim having a bottom surface, a top surface, and a thickness ($t_2$) between said bottom surface to said top surface;

a plurality of rigging fitting holes evenly spaced in a circular pattern in said outer rim such that an angle $\theta$ between 10°–20° is formed between any two adjacent rigging fitting holes;

a plurality of rigging fittings that pass through said rigging fitting holes suspending said device;

a transition that extends from and connects said inner rim to said outer rim;

said transition being uniform and solid throughout;

said transition having a thickness ($t_3$); and said transition extending at an angle $\phi$ from said inner rim.

* * * * *